United States Patent
Planche et al.

(10) Patent No.: US 9,643,596 B2
(45) Date of Patent: May 9, 2017

(54) METHOD FOR CONTROLLING THE STATE OF A DRIVE TRAIN OF A POWER TRAIN OF AN ELECTRIC, HYBRID OR COMBUSTION ENGINE VEHICLE

(71) Applicant: RENAULT s.a.s., Boulogne-Billancourt (FR)

(72) Inventors: Gregory Planche, Orsay (FR); Frederic Roudeau, Vitry-sur-Seine (FR); Aurelien Lefevre, Meudon (FR)

(73) Assignee: RENAULT S.A.S., Boulogne-Billancourt (FR)

( * ) Notice: Subject to any disclaimer, the term of this patent is extended or adjusted under 35 U.S.C. 154(b) by 0 days.

(21) Appl. No.: 14/780,890

(22) PCT Filed: Mar. 12, 2014

(86) PCT No.: PCT/FR2014/050561
§ 371 (c)(1),
(2) Date: Sep. 28, 2015

(87) PCT Pub. No.: WO2014/162076
PCT Pub. Date: Oct. 9, 2014

(65) Prior Publication Data
US 2016/0075323 A1    Mar. 17, 2016

(30) Foreign Application Priority Data

Apr. 5, 2013  (FR) .................................... 13 53077

(51) Int. Cl.
*B60L 9/00*       (2006.01)
*B60W 20/30*   (2016.01)
(Continued)

(52) U.S. Cl.
CPC ............... *B60W 20/30* (2013.01); *B60K 6/48* (2013.01); *B60W 10/06* (2013.01); *B60W 10/08* (2013.01);
(Continued)

(58) Field of Classification Search
USPC .......................................................... 701/22
See application file for complete search history.

(56) References Cited

U.S. PATENT DOCUMENTS

| 7,356,391 B2 * | 4/2008 | Matsuda | ................... B60K 6/44 180/65.285 |
| 7,762,365 B2 * | 7/2010 | Iwanaka | ................... B60K 6/40 180/65.22 |

(Continued)

FOREIGN PATENT DOCUMENTS

| AT | 508 066 A2 | 10/2010 |
| DE | 10 2008 042 132 A1 | 3/2010 |
| DE | 10 2011 114 440 A1 | 3/2013 |

OTHER PUBLICATIONS

International Search Report Issued Jun. 3, 2014 in PCT/FR14/050561 Filed Mar. 12, 2014.

(Continued)

*Primary Examiner* — Hussein A. Elchanti
(74) *Attorney, Agent, or Firm* — Oblon, McClelland, Maier & Neustadt, L.L.P.

(57) ABSTRACT

A method for controlling a state of a drive train of a power train including at least one motive power source and a set of couplers and reducers of which respective engagements define a plurality of states of the drive train, by engagement of one or a plurality of energy sources in provision of torque and by the ratio of transmission of same to wheels. States targeted from a current state are ranked in real time on the (Continued)

Figure 1:
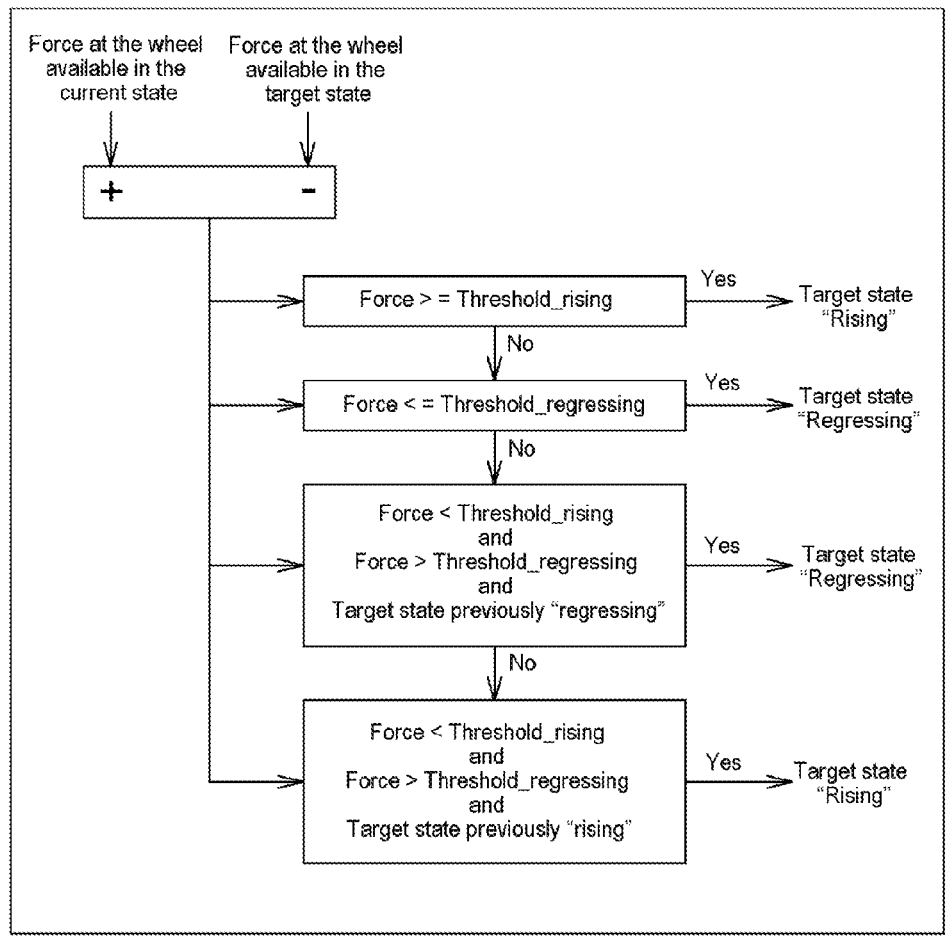

basis of the difference between the motive force available in a current state and in each target state.

9 Claims, 2 Drawing Sheets

(51) Int. Cl.
*B60K 6/48* (2007.10)
*B60W 10/06* (2006.01)
*B60W 10/08* (2006.01)
*B60W 10/11* (2012.01)
*F16H 61/02* (2006.01)
*B60W 20/11* (2016.01)
*B60W 20/10* (2016.01)
*F16H 61/662* (2006.01)
*F16H 59/14* (2006.01)

(52) U.S. Cl.
CPC ............ *B60W 10/11* (2013.01); *B60W 20/10* (2013.01); *B60W 20/11* (2016.01); *F16H 61/0213* (2013.01); *F16H 61/66227* (2013.01); *B60W 2710/105* (2013.01); *F16H 2059/148* (2013.01); *F16H 2061/0216* (2013.01); *F16H 2061/66204* (2013.01); *Y02T 10/6221* (2013.01); *Y02T 10/6286* (2013.01); *Y02T 10/7258* (2013.01); *Y10S 903/945* (2013.01)

(56) References Cited

U.S. PATENT DOCUMENTS

| | | | |
|---|---|---|---|
| 8,433,465 B2* | 4/2013 | Yamazaki | B60K 6/448 701/22 |
| 9,162,670 B2* | 10/2015 | Amano | B60K 6/445 |
| 9,193,278 B2* | 11/2015 | Amano | B60K 6/445 |
| 2004/0134697 A1* | 7/2004 | Kobayashi | B60K 6/485 180/65.26 |
| 2006/0048982 A1* | 3/2006 | Yamamoto | B60K 6/44 180/65.225 |
| 2009/0211826 A1* | 8/2009 | Hashimoto | B60K 6/365 180/65.275 |
| 2010/0087288 A1* | 4/2010 | Yamamoto | B60K 6/445 477/3 |
| 2011/0130901 A1 | 6/2011 | Mori et al. | |
| 2011/0192666 A1* | 8/2011 | Schmid | B60K 6/28 180/165 |
| 2011/0213519 A1 | 9/2011 | Huber | |
| 2013/0282245 A1 | 10/2013 | Dietzel et al. | |

OTHER PUBLICATIONS

French Search Report Issued Nov. 27, 2013 in French Application 1353077 Filed Apr. 5, 2013.

* cited by examiner

METHOD FOR CONTROLLING THE STATE OF A DRIVE TRAIN OF A POWER TRAIN OF AN ELECTRIC, HYBRID OR COMBUSTION ENGINE VEHICLE

The present invention relates to the field of strategies for controlling power trains of hybrid vehicles.

The targeted strategies are those that aim at optimizing the operating point of a hybrid power train (PT) by controlling the changes to the state of its drive train.

More precisely, this invention relates to a method for controlling the state of a drive train of a power train comprising at least one motive power source and a set of couplers and reducers of which the respective engagements define a plurality of drive train states, accessible by the engagement of one or a plurality of energy sources in the torque provision, and by the transmission ratio thereof to the wheels.

The invention is applied preferably to a PT of a hybrid vehicle comprising at least one combustion engine and an electric traction machine, having a number of transmission ratios over one or a plurality of operating modes, i.e. hybrid, thermal or electric operating modes. This invention is also applicable to a combustion PT, with no electric traction machine.

The state of a drive train of a PT is defined by a combination of coupler(s) and reducer(s), specific to an architecture of the vehicle in question.

In the case of a conventional gearbox, the state of the drive train is defined by the engagement of a reducer, for example of first gear, and by the closure of an input clutch. In the case of a hybrid vehicle, not only do the input clutch (if there is one) and speed reducers come into play, but also electric motors propelling the vehicle, in particular via the rear wheels.

In the case of a hybrid PT, the main differences are as follows:
- the combustion engine is no longer the only source of motive power,
- for the same power at the wheels, various combinations are possible between the power delivered by the combustion engine and that delivered by the electric traction machine(s),
- depending on the envisaged technical definition, the power of the electric machine may or may not be transported through the transmission,
- the static and dynamic limitations of the PT may be dependent on the state of charge of the battery, and
- the electric mode or ZEV for "zero emission vehicle" combines one or more drive train states, in the same way as the separate ratios.

Publication U.S. Pat. No. 6,067,495 discloses a method for ranking available ratios with an automatic gearbox in a fixed table. However, the method does not make it possible to rank the states of the drive train of the gearbox in real time.

In a strictly combustion or strictly electric PT, a downshifting is simply a change to a decreasing ratio, from n to n−1, for example from fifth to fourth, and an upshifting is simply a ratio change from n to n+1, for example from fourth to fifth. When the driver performs a downshift he seeks to obtain more traction for his vehicle or to brake the engine (braking or removal of foot from the accelerator pedal). However, the simple tiered structure of the gear ratios of a combustion vehicle (ratio 1, 2, 3, 4, 5 and 6 for example) is insufficient to rank the states of the drive train of a hybrid vehicle due to the different possible combinations of available ratios and sources of wheel torque.

In addition, for the same operating point (speed, motive power), the acoustic phenomena are dependent on the distribution between the electric power and the combustion power. In fact, if the electric machine functions alone, the PT will be quieter than if the two engines (combustion and electric) function together.

Lastly, in the case of a hybrid vehicle, the driving comfort, which is linked to the performance of the PT, becomes dependent on the state of charge of the battery. If the battery is charged, the power delivered by the electric machine and by the combustion engine can be used simultaneously. If the battery is discharged, the only source of energy available is the combustion engine, with a possible reduction in performance. The distribution of the power between the two energy sources is determined by the laws of energy management, imposing a distribution between the power delivered by the combustion engine and that delivered by the electric motor, depending on the state of charge of the battery. These laws are implemented in particular in order to satisfy consumption and depollution requirements.

The object of the present invention is to develop a setpoint of the state of the drive train of a vehicle making it possible to optimize the sought compromise between the acoustic level of the vehicle, driving comfort, consumption reduction, and depollution requirements.

With this objective the invention proposes that states of the drive train, targeted from the current state thereof, be ranked in real time on the basis of the difference between the motive force available in the current state and in each target state.

The maximum motive force is preferably defined in each of these states on the basis of gear ratios, maximum torques that can be provided by the electric machine and the combustion engine, and the engine speed or speed of the vehicle.

Figure 2:
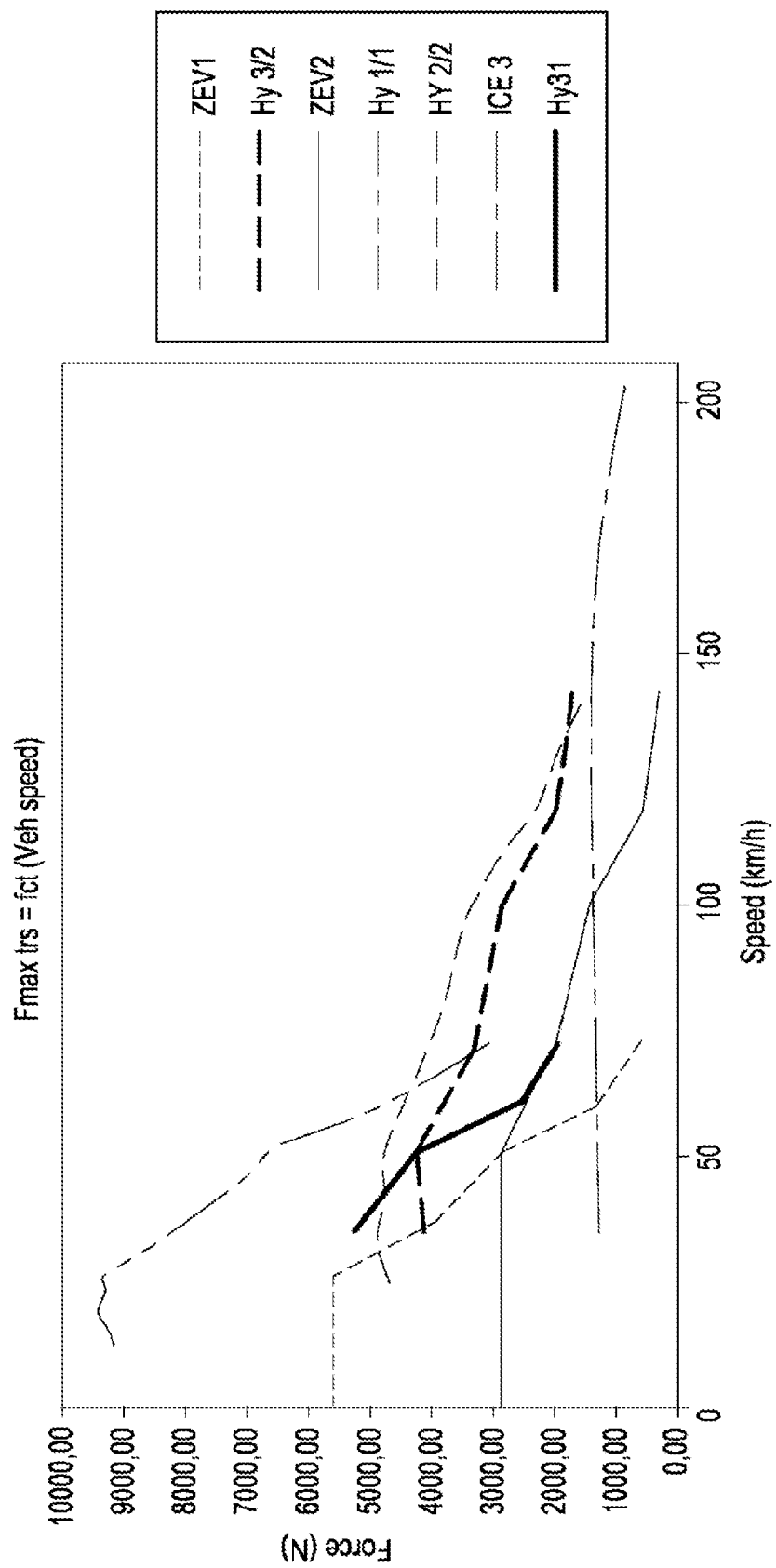

The present invention will be better understood upon reading the following description of a non-limiting embodiment thereof, given with reference to the accompanying drawings, in which:

FIG. 1 is a flowchart of the proposed strategy for ranking "rising" and "regressing" drive chain states, and FIG. 2 shows the force available to the wheel, for each state of the kinematic chain, on the basis of the speed.

As indicated above, the ranking of the drive chain states established for the gearbox ratios of a combustion vehicle is ineffective in the case of a hybrid PT due to different possible combinations of wheel torque sources and transmission ratios. The strategy proposed is based on all traction forces available in each of the drive chain states available in a PT and on the corresponding vehicle architecture. Similarly to conventional transmissions, the term "rising" applies to a target state of a hybrid PT when this state provides the wheel with a tractive force that is less than that of the current ratio. Similarly, the term "regressing" or descending applies to a target drive chain state that provides the wheel with a greater tractive force compared with that of the current ratio.

The flowchart of FIG. 1 shows the strategy. The first step is the calculation of the difference between the tractive force available at the wheel in the current state and the tractive force available at the wheel in a kinematic chain state selected as target. Three cases are shown:
- If this difference is greater than or equal to a first calibrated threshold, referred to as "threshold_rising", the targeted state is considered to be a "rising state" compared with the current state.
- If this difference is less than or equal to a second calibrated threshold, referred to as "threshold_regressing", the targeted state is considered to be a descending or "regressing" state compared with the current state.
- If the different is strictly greater than the "threshold_regressing" and strictly lower than the "threshold_rising", two assessments are possible:

a. if the targeted state was previously considered to be a "regressing" state then it remains "regressing", b. if the target kinematic chain state was previously considered to be a "rising" state then the state remains "rising".

This strategy is applicable to all hybrid or combustion architectures, in particular to hybrid transmissions including a combustion engine and an electric machine, such as that described in publication WO2012/131259, comprising two main concentric shafts each carrying at least one downshifting pinion gear on a secondary shaft connected to the wheels of the vehicle. This transmission comprises two coupling means. The first may occupy at least three positions, in which:

the combustion engine is decoupled from the kinematic chain connecting the electric machine to the wheels, the combustion engine drives the wheels with or without the addition of the electric machine in a long ratio, and the combustion engine and the electric machine are coupled so as to add together their respective torques in the direction of the wheels.

The second coupling means may also occupy three positions, i.e. a neutral gear position and two ratio engagement positions (short and intermediate).

This transmission has three ratios and seven kinematic chain states, for each of which FIG. 2 shows the available forces (maximum tractive force Fmax trs), on the basis of the speed of the vehicle. The two first ratios, short and intermediate, are accessible in electric mode. They define the two states "ZEV1" and "ZEV2". The third ratio, or long ratio, is accessible in combustion mode. It defines a state "ICE3". Four hybrid states are accessible depending on the positions of the two coupling means: a first hybrid state "HY1/1", in which the two main shafts are coupled and in which the torque descends over the short ratio, a second hybrid state "HY2/2", in which the two main shafts are coupled and in which the torque descends over the intermediate ratio, a third hybrid state "HY3/1", in which the two primary shafts are decoupled and in which the torque of the combustion engine descends over the long ratio and the torque of the electric motor descends over the short ratio, and a fourth hybrid state "HY3/2", in which the two primary shafts are decoupled and in which the torque of the combustion engine descends over the long ratio and the torque of the electric motor descends over the intermediate ratio. In each of these states the maximum force is defined on the basis of the associated gear ratios, maximum torques that can be provided by the electric machine and the combustion engine, and also engine speed or speed of the vehicle. The targeted states are ranked as rising or descending depending on whether the available motive force difference is positive or negative. The table below illustrates the ranking of the target states of the drive chain on the basis of the current state "HY31", depending on the speed of the vehicle, assuming that the previous state was "HY32" and that this state was previously deemed to be "rising" (HY32 Rising) or "descending" (HY32 descending).

When the vehicle travels at 30 km/h and the current state HY31 has a force 1000 N greater than that available in the target state HY32, the latter, which was previously rising, remains rising (a).

When the vehicle travels at 50 km/h and the current state HY31 has a force 10 N less than that available in the state HY32, the latter remains of the rising type however, because the difference is not sufficiently great to avoid hysteresis phenomena (b).

When the vehicle travels at 55 km/h and the current state HY31 has a force 200 N less than that available in the state HY32, the latter then becomes of the regressing type (c).

When the vehicle travels at 70 km/h and the current state HY31 has a force 1500 N less than that available in the state HY32, the latter remains of the regressing type (d).

When the vehicle travels at 49 km/h and the current state HY31 has a force 10 N greater than that available in the state HY32, the latter remains of the regressing type, however, because the difference is not sufficiently great to change it without the appearance of hysteresis (e).

When the vehicle travels at 45 km/h and the current state HY31 has a force 200 N greater than that available in the state HY32, the latter becomes of the rising type (f).

In accordance with the method the ranking of all the targeted states is implemented in real time on the basis of the speed of movement of the vehicle and on the basis of the difference between the motive force available in the current state and in each target state.

This ranking or "typing" of the target state (HY32 in the example above) also makes it possible to define, in real time, a minimum level or "force constraint" to be satisfied by this target state so as to be able to be adopted as a current ratio. Two constraint levels C1 or C2, depending on which the target state is "rising" or "regressing", are defined in the table.

The rising ratio constraint C1 is preferably greater than the regressing ratio constraint C2. The purpose of the distance between C1 and C2 is to impose a greater power reserve for the rising switches than for the descending switches so as not to choose a drive chain state that risks being abandoned in the event of a slight rise of the motive force setpoint.

If the force available in the targeted state HY32 is less than the required constraint level (C1 or C2 for HY32), this state cannot be adopted. In cases (a), (b) and (f) the force available in state HY32 must be greater than the force constraint C1; in the other cases (c), (d) and (f) it is sufficient that this force is greater than the constraint C2 in order for the state HY32 to be adoptable.

The ranking of the targeted states thus determines, in real time, a minimum level of motive force available in each targeted state so as to be able to be adopted as the current state. The minimum force level for a rising targeted ratio is greater than the minimum force level for a descending targeted ratio.

| V. veh | F. HY31 (N) | F. HY32 (N) | Diff. (N) | HY32 prev. | HY32 target | Force constraint |
|---|---|---|---|---|---|---|
| (a) 30 | 5200 | 4200 | 1000 | Rising | Rising | C1 |
| (b) 50 | 4200 | 4190 | −10 | Rising | Rising | C1 |
| (c) 55 | 4000 | 4200 | −200 | Rising | Regressing | C2 |
| (d) 70 | 2000 | 3500 | −1500 | Regressing | Regressing | C2 |
| (e) 49 | 4210 | 4200 | 10 | Regressing | Regressing | C2 |
| (f) 45 | 4400 | 4200 | 200 | Regressing | Rising | C1 |

This table shows how it is possible to control, in a particular case, the switches from one particular drive chain state, here HY31, to another state, HY32. With the proposed method this ranking is performed for all the possible changes between the states ICE 3, ZEV1, ZEV2, HY1/1, HY2/2, HY3/1, HY3/2. All of the switches between these states are thus controlled. This ranking is decisive for the choice of the optimal state of the drive chain.

In the described example the PT has seven drive chain states, distributed over the three ratios of the transmission: a short and intermediate ratio in electric mode, a short ratio, an intermediate ratio and a long ratio in hybrid mode, and a long ratio in combustion mode. The method makes it possible to control all switches between the different states of the chain in electric mode, in hybrid mode and in combustion mode.

This method, described on the basis of its application in the particular case of a hybrid transmission having the seven identified states, generally makes it possible to control the state of each drive chain of the power train comprising at least one motive energy source and a set of couplers and reducers of which the respective engagements define a plurality of accessible chain states, by the engagement of one or a plurality of energy sources in the provision of torque and by the transmission ratio thereof to the wheels.

Generally, the method can be applied to any PT equipped with one or more energy sources usable with one or more transmission ratios, thus making it possible to control the switches between a number of states between the electric, hybrid and combustion modes.

The method has numerous advantages. It firstly makes it possible to optimize the consumption and depollution of the vehicle. Because the electrification of a PT is primarily substantiated by the reduction in consumption, the strategy implemented may advantageously interact with the energy management laws thereof. The method also makes it possible to optimize the driving comfort of the vehicle by varying the level thereof, during operation, of the state of charge of the battery, and also the desired performance.

The invention claimed is:

1. A method comprising:
controlling a state of a drive chain of a power train having at least one motive power source, and a set of couplers and reducers of which respective engagements define a plurality of drive chain states, by engaging one or a plurality of energy sources providing torque and by a transmission ratio thereof to wheels; and
ranking in real time drive chain states targeted from a current state on the basis of the difference between motive force available in the current state and in each target state,
wherein the controlling of the state of the drive chain is based on the ranking of the drive chain states.

2. The control method as claimed in claim 1, wherein, in each of the drive chain states, a maximum motive force is defined on the basis of gear ratios, maximum torques that can be provided by an electric machine and a combustion engine, and on an engine speed or speed of a vehicle.

3. The control method as claimed in claim 1, wherein the target states are ranked as rising or descending depending on whether an available motive force difference compared with the current state is positive or negative.

4. The control method as claimed in claim 3, wherein the ranking of the target states is implemented in real time on the basis of a speed of movement of a vehicle.

5. The control method as claimed in claim 3, wherein if the difference in motive force between the targeted state and the current state is greater than a first calibrated threshold, the targeted state is considered to be rising compared with the current state.

6. The control method as claimed in claim 5, wherein if the difference in motive force between the targeted state and the current state is less than a second calibrated threshold, the targeted state is considered to be descending compared with the current state.

7. The control method as claimed in claim 6, wherein if the difference is strictly greater than the second threshold and strictly lower than the first threshold, a targeted state previously considered as a descending state remains a descending state and a targeted state previously considered as a rising state remains rising.

8. The control method as claimed in claim 1, wherein the ranking of the targeted states determines, in real time, a minimum level of motive force available in each targeted state to be able to be adopted as a current state.

9. The control method as claimed in claim 5, wherein a level of minimum force for a rising targeted ratio is greater than a level of minimum force for a descending targeted ratio.

* * * * *